(12) United States Patent
Chen

(10) Patent No.: US 6,416,060 B1
(45) Date of Patent: Jul. 9, 2002

(54) CYCLE WITH ANIMATION DISPLAY

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/082,206

(22) Filed: Feb. 26, 2002

(51) Int. Cl.⁷ .............................................. A63G 17/00
(52) U.S. Cl. ..................... 280/1.165; 40/437; 40/590; 280/87.041; 446/448
(58) Field of Search .................. 40/421, 436, 437, 40/590; 446/440, 448, 449; 280/1.165, 1.167, 1.192, 1.201, 87.021, 87.041

(56) References Cited

U.S. PATENT DOCUMENTS

| | | | | |
|---|---|---|---|---|
| 385,910 A | * | 7/1888 | Clark | 280/1.165 |
| 1,095,410 A | * | 5/1914 | Medveczky | 40/437 |
| 1,859,617 A | * | 5/1932 | Carlstrom | 280/1.165 |
| 2,523,417 A | * | 9/1950 | Brown | 280/1.165 |
| 2,880,010 A | * | 3/1959 | Levinson | 280/1.165 |
| 3,159,936 A | * | 12/1964 | Musaphia | 40/437 |
| 3,314,179 A | * | 4/1967 | Leach | 40/437 |
| 6,226,906 B1 | * | 5/2001 | Bar-Yona | 40/437 |

\* cited by examiner

*Primary Examiner*—Michael Mar
(74) *Attorney, Agent, or Firm*—Rosenberg, Klein & Lee

(57) ABSTRACT

A structure of a pedal cycle with animation display comprises a screen, a linking cord, a transmission gear and a retainer adapted to a frame of the cycle; the screen including a cabinet having a built-in display panel and a cover plate; a display section provided on the front of the cabinet, the display board driven by the linking cord; a transparent film having multiple lines thereon; a board adhered with a pattern being provided on the cover plate; the transmission gear having an active gear and fixed to a hub of a wheel of the cycle; the retainer fixed to the frame of the cycle having a passive part fastened to the linking cord; the transmission gear being driven by the advancing cycle to rotate with its active gear relatively to the passive part and to indirectly drive the linking cord by compromising the circumference of the active gear, then the display panel for the transparent film to move between the display section of the screen and the board of the cover plate.

4 Claims, 8 Drawing Sheets

CYCLE WITH ANIMATION DISPLAY

BACKGROUND OF THE INVENTION (a) Field of the Invention

The present invention relates to a pedal cycle with animation display, and more particularly, to an animation display simultaneously provided as the pedal cycle is in operation to add more fun for a rider.

(b) Description of the Prior Art

Most of the conventional pedal cycles, e.g., tricycles, scooters or a shopping carts provided with a seat for children, stationary bicycles, or bicycles, indicate a monotonous structure of a frame with its variety, if any, being observed with its contour or color, or certain decoration items being added to the handle to attract a child to ride on it. However, it's usually boring to ride on it for the absence of any change in visual image (pattern) for the structure of the conventional pedal cycle, thus it is not very popular among the consumers.

SUMMARY OF THE INVENTION

The primary purpose of the present invention is to provide a pedal cycle with animation display. To achieve the purpose, the present invention comprising a screen, a linking cord, a transmission gear and a retainer adapted to a frame of the cycle to display animation is mounted at where appropriately to the pedal cycle; characterized by that:

a cabinet of the screen has a built-in display panel enclosed with a cover plate; a display section is provided on the cabinet; the display panel operates with a linking cord; a transparent film is inserted to the display panel in relation to the cabinet; multiple fine lines are intensively protruding from the transparent film; a board adhered with a pattern is provided on the face of the cover plate; the transmission gear including an active gear is inserted into an axis of a wheel of the cycle; the retainer is mounted to the frame of the cycle in relation to the transmission gear; and a passive part connected to the transmission cord is provided on the retainer; accordingly, as the cycle is advancing, the transmission gear rotates with its active gear relatively to the passive part, the display panel is driven by the linking cord which is indirectly driven by the curvature formed by the circumference of the active gear; and the transparent film moves between the display section of the cabinet for the board on the cover plate to present an animation effect depending on the pattern provided on the board.

DETAILED DESCRIPTION OF THE PREFERRED EMBODIMENTS

Figure 1:
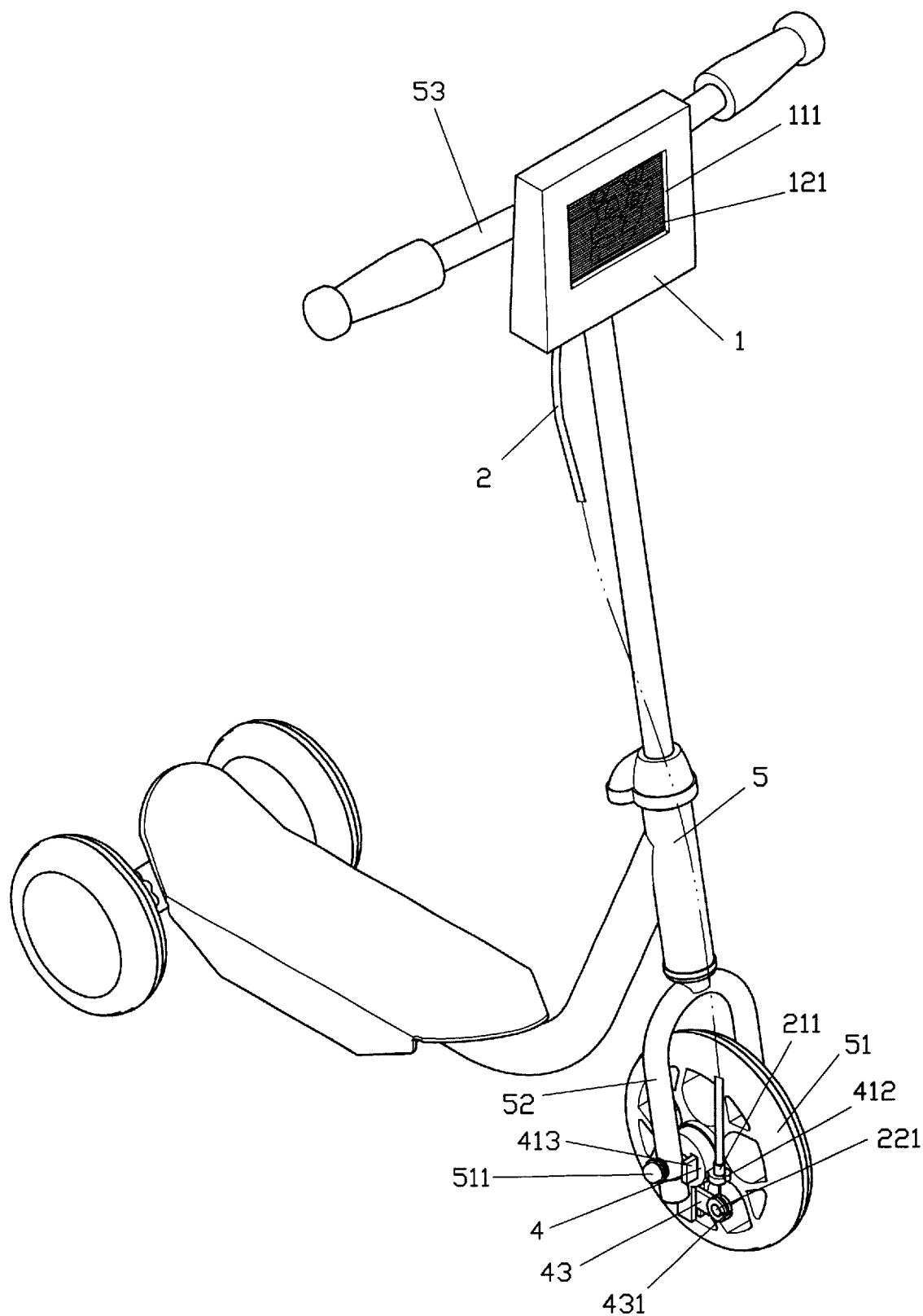
FIG. 1 is a perspective view of a preferred embodiment of the present invention.
Figure 2:
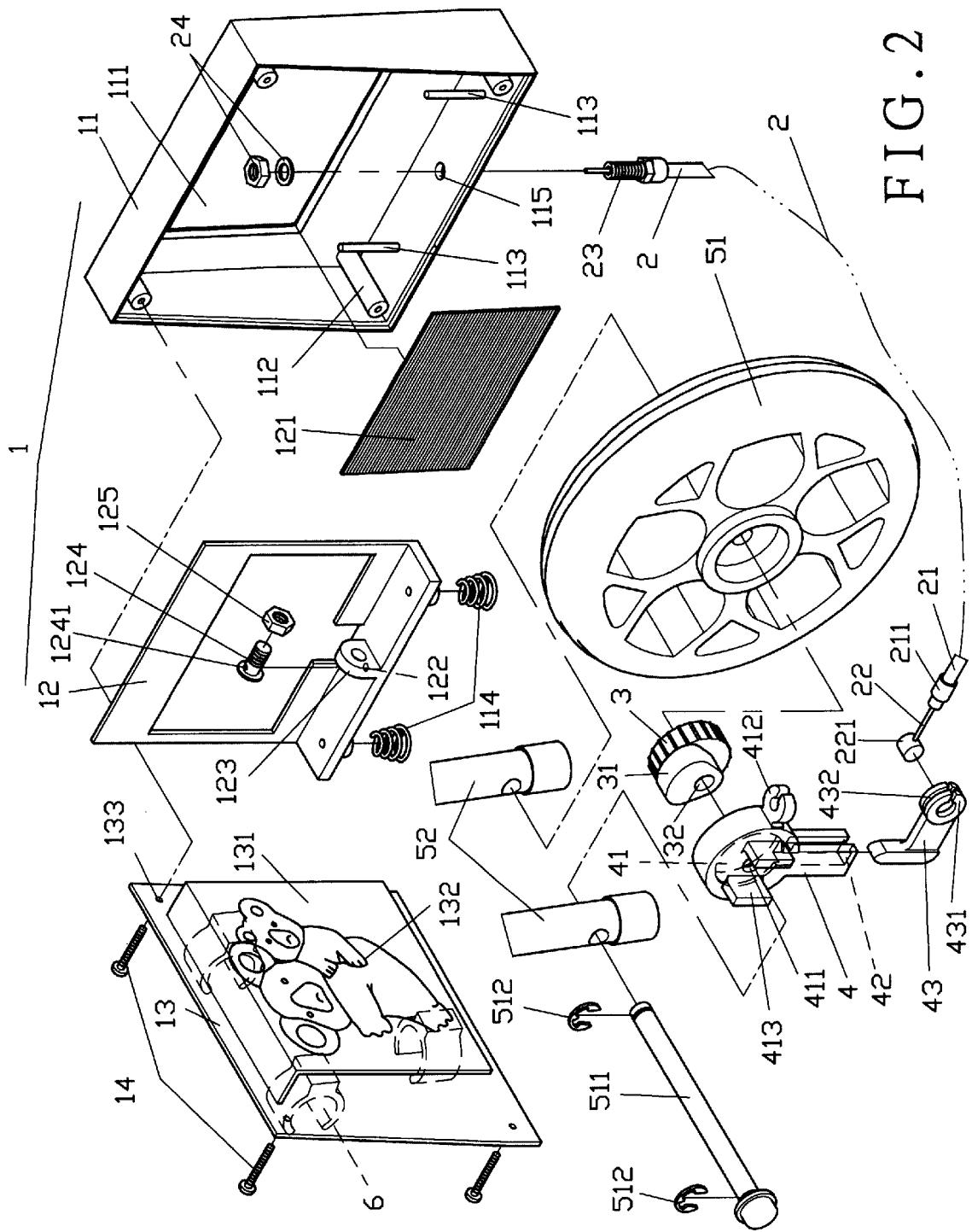
FIG. 2 is a schematic view showing that the preferred embodiment of the present invention is in use.

Referring to FIGS. 1 and 2, the present invention, essentially comprising a screen (1), a linking cord (2), a transmission gear (3) and a retainer (4) adapted to a frame (5) of the pedal cycle, is provided to present 3D animation effect on the screen (1) while a pedal cycle is advancing.

The screen (1) is composed of a cabinet (11), a built-in display panel (12) and a cover plate (13). The cabinet (11) is a hollow structure having at its front face provided with a display section (111) supported by multiple fixation sleeves (112) each respectively provided in four corners in the cabinet (11) and fixed to the coverplate (13) with a fastener (14). At the inner bottom of the cabinet (11) are provided with two posts (113) inserted into their respective springs (114). A hole (115) bored in the inner bottom of the cabinet (11) at where between the two posts (113). A transparent film (121) is framed in the display panel (12) relatively to the display section (111) of the cabinet (11). Multiple lateral lines are provided on the film (121). The film (121) for being positioned by the display panel (12) faces the display section (111) of the cabinet (11). Another hole (122) is bored in the lower edge of the display panel (12) relatively to the hole (115). A pivot (123) is provided also on the lower edge of the display panel (12) at where close to the hole (122). The cover plate (13) is formed by corresponding to the size of the cabinet (11) and a board (131) adhered with a pattern (132) is formed thereupon. The pattern (132) may be provided in a graphic form with multiple shades. Multiple positioning holes (133) are provided on the surface of the cover plate (13).

The linking cord (2) is a cord (22) passing through a bushing (21). One end of the bushing (21) is provided with a retaining ring (211) while the other end, a bonnet (23) having outer threads fixed with a fastener (24) to the cabinet (11). One end of the cord (22) is formed a retaining block (221) and the other end, passing through the hole (115) of the cabinet (11) and the hole (122) in the lower edge of the display panel (122) before being fixed to the pivot (123) with a locking bolt (124) and a nut (125) so to interact with the display panel (12).

The transmission gear (3) is inserted to an axis (511) of a wheel (51) of the frame (5) of the pedal cycle. An active gear (31) is separately fixed to the axis of the transmission gear (3). The active gear (31) may be a cam or an eccentric gear (the cam is the case as illustrated in the first preferred embodiment of the present invention). Concentrically, a central hole (32) is axially bored through the active gear (31) and the transmission gear (3). The retainer (4) is formed in relation to the active gear (31) of the transmission gear (3) and has a trough (41) provided with a hole (411). A stopper (412) protrudes from the outer periphery of the trough (41). Two positioning ribs (413) relatively protrude in parallel on the outer surface of the trough (43). A chute (42) connecting through the trough (41) is provided at the bottom of the trough (41) to accommodate a passive part (43). A ring base (431) with a slot (432) provided in its periphery for insertion extends from the passive part (43).

Figure 3:
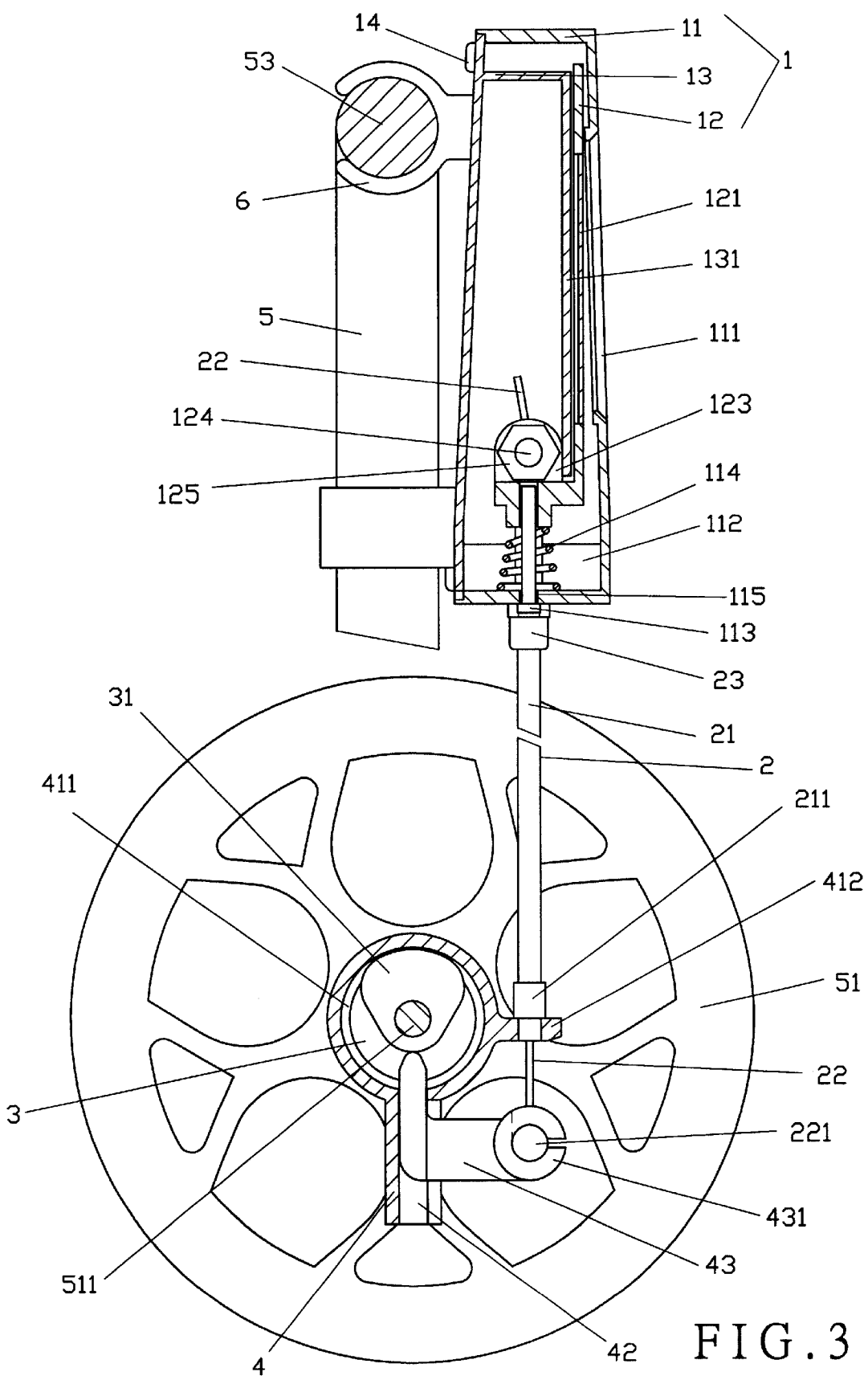
FIG. 3 is a sectional view of an assembly of the preferred embodiment of the present invention.

Now referring to FIG. 3, the first preferred embodiment of the present invention is adapted to a front wheel (51) of the frame (5) of the pedal cycle. The retaining block (221) disposed at one end of the linking cord (2) is inserted in the ring base (431) of the retainer (4). The cord (22) passes the stopper (412) through the slot (432). The retaining ring (211) of the bushing (21) of the linking cord (2) is restricted by the stopper (412). Another end of the cord (22) of the linking cord (2) respectively passes through the hole (115) of the cabinet (11), the hole (122) of the display panel (12) and a locking hole (1241) in the locking bolt (124). Then the locking bolt (124) laterally passes through the cord (22) so to fix it to the pivot (123) of the display panel (12). As a result, the retainer (4) is fixed to a fork (52) of the frame (5) with its positioning ribs (413). The retainer (4), the transmission gear (3) and the wheel (51) are then inserted together in sequence relatively to a hub (511) of the front wheel (51), and held in position by means of two clamps (512). Finally, the screen (1) is fixed with multiple fixation members (6) to the center of a handle (53) of the frame (5).

Figure 4:
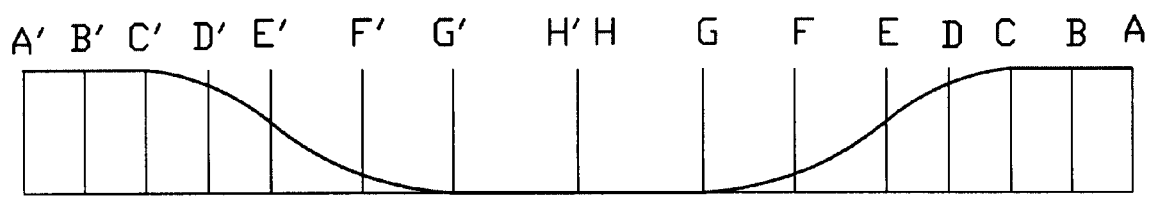
FIG. 4 is an operation curve of a cam in the preferred embodiment of the present invention.
Figure 4:
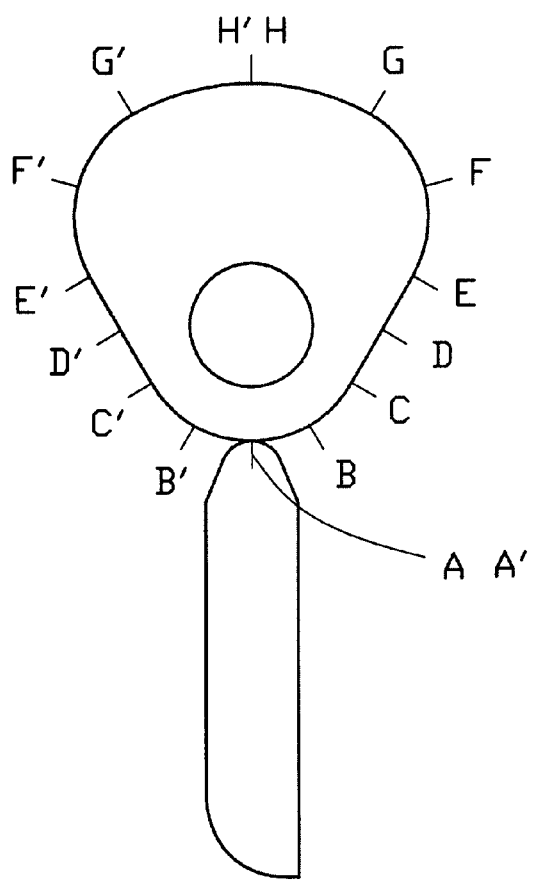
Figure 5:
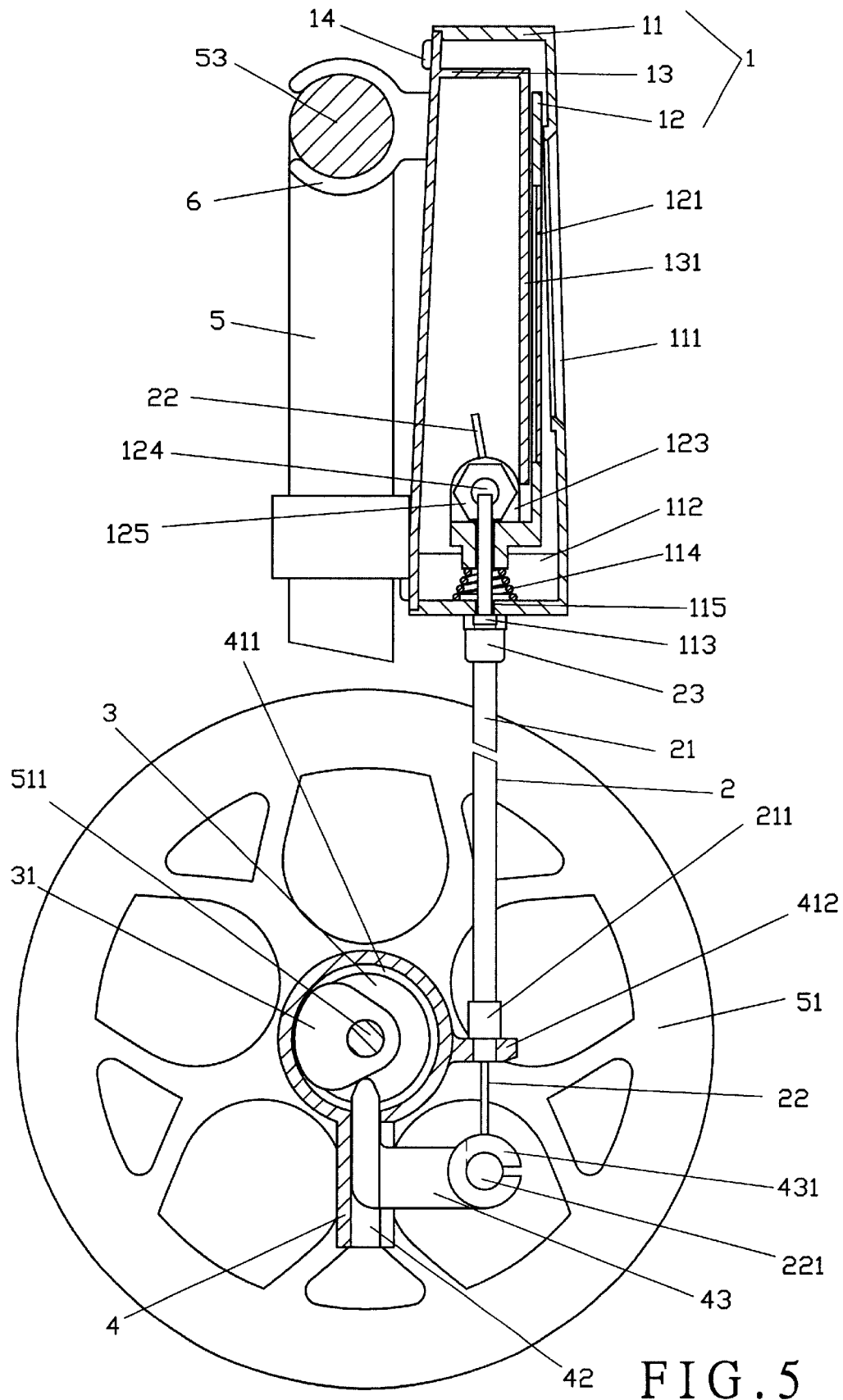
FIG. 5 is a schematic view showing the operation of the preferred embodiment of the present invention.

In practice, once the frame (5) advances, the wheel (51) synchronously drive the transmission gear (3) inserted to the hub (511) so that the active gear (31) of the transmission gear (3) rotates in relation to the passive part (43). In the first preferred embodiment of the present invention, a cam is used for the active gear (31). Referring to FIG. 4, according to the working theory of a cam, the passive part (43) is at its apex without moving when the active gear (31) travels from Point A/A' to C. That is, the display panel (12) stays without moving and only the pattern is displayed in the absence of animation effect. Once the active gear (31) travels in relation to the passive part (43) beyond Point C to reach Point E, the passive part (43) enters into its descending travel. Also referring to FIG. 5, the passive part (43) moves along the circumferential curve of the active gear (31) to gradually retreat downward in the chute (42) at a speed subject to that of the wheel (51) During the descending travel, the passive part (43) retreats from the trough (41). Consequently, the passive part (43) moves downward between the display section (11) of the screen (1) and the board (131) on the cover plate (13) when the ring base (431) inserted to the trough (41) drives the cord (22) in the bushing (21) of the linking cord (2), and further drives the display panel (12) to compress the springs (114) covering their respective posts (113).

Figure 6:
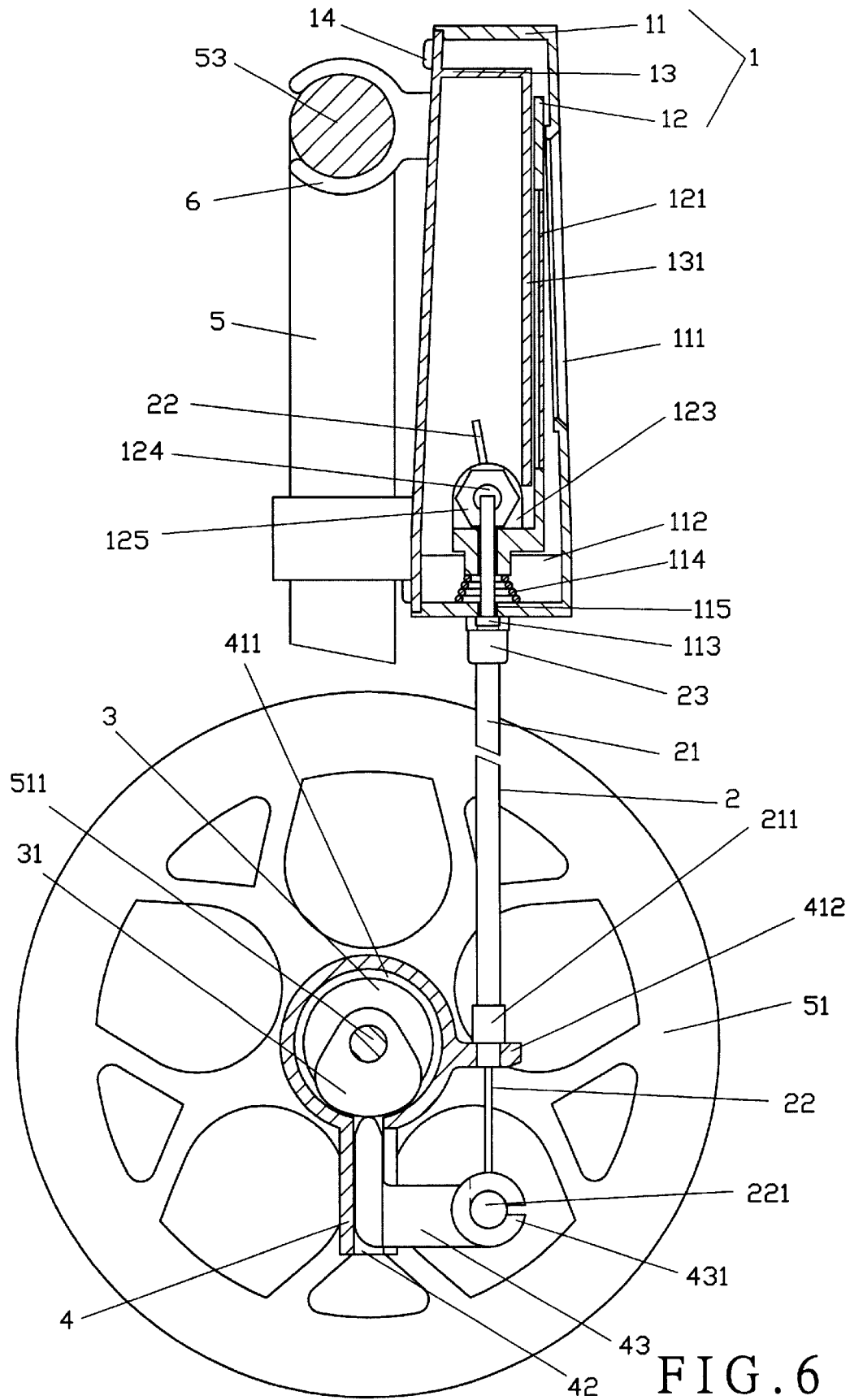
FIG. 6 is another schematic view showing the operation of the preferred embodiment of the present invention.

When the active gear (31) travels from Point E to Point G, defining a section with a shorter and sharper curvature, resulting in that the passive part (43) moves fast and downward during said section. The passive part (43) is then at its lowest in the entire circumferential motion as illustrated in FIG. 6 when the active gear (31) travels from Point G to Point G', a section with longer and smoother curvature (i.e. at where the active gear (31) is at where farthest away from the axis and holds against the end of the passive part (43). Meanwhile, a short time still for the motion of the active gear (31) is created and the display panel (12) is in a state that it fully compresses the springs (114) when pulled by the linking cord (2). Accordingly, the multiple images of the pattern (132) are exposed and showing various dynamic effects that are different from the original status of the pattern (132). When the active gear (31) returns from Point H/H' to Point A/A' (at where the active gear (31) is on the circumference nearest to the axis) to complete the entire travel as illustrated in FIG. 3, the passive part (43) is returned to its initial position as indirectly driven by the linking cord (2) when the display panel (12) is subject to the return force from the springs (114).

Whereas the end of the passive part (43) moves in cycle at various speeds depending on the curvature of the circumference of the active gear (31), the passive part (43) is driven by the wheel (51) via the transmission gear (3) to repeat its cycle of instantaneous still→moving downward→short time still→moving upward→short time still. As the wheel (51) is cycling very fast, the transparent film (121) formed in the display panel (12) also fast repeats its cycle of instantaneous still and moving upward and downward between the display section (111) on the cabinet (11) of the screen (1) and the board (131) on the cover plate (13). Furthermore, by means of the lines provided on the transparent film (121) of the display panel (12), the pattern (132) on the board (131) presents dynamic effects due to the cycle of short time still and short time motion, resulting in various visual appreciation at various speed of animation.

Figure 7:
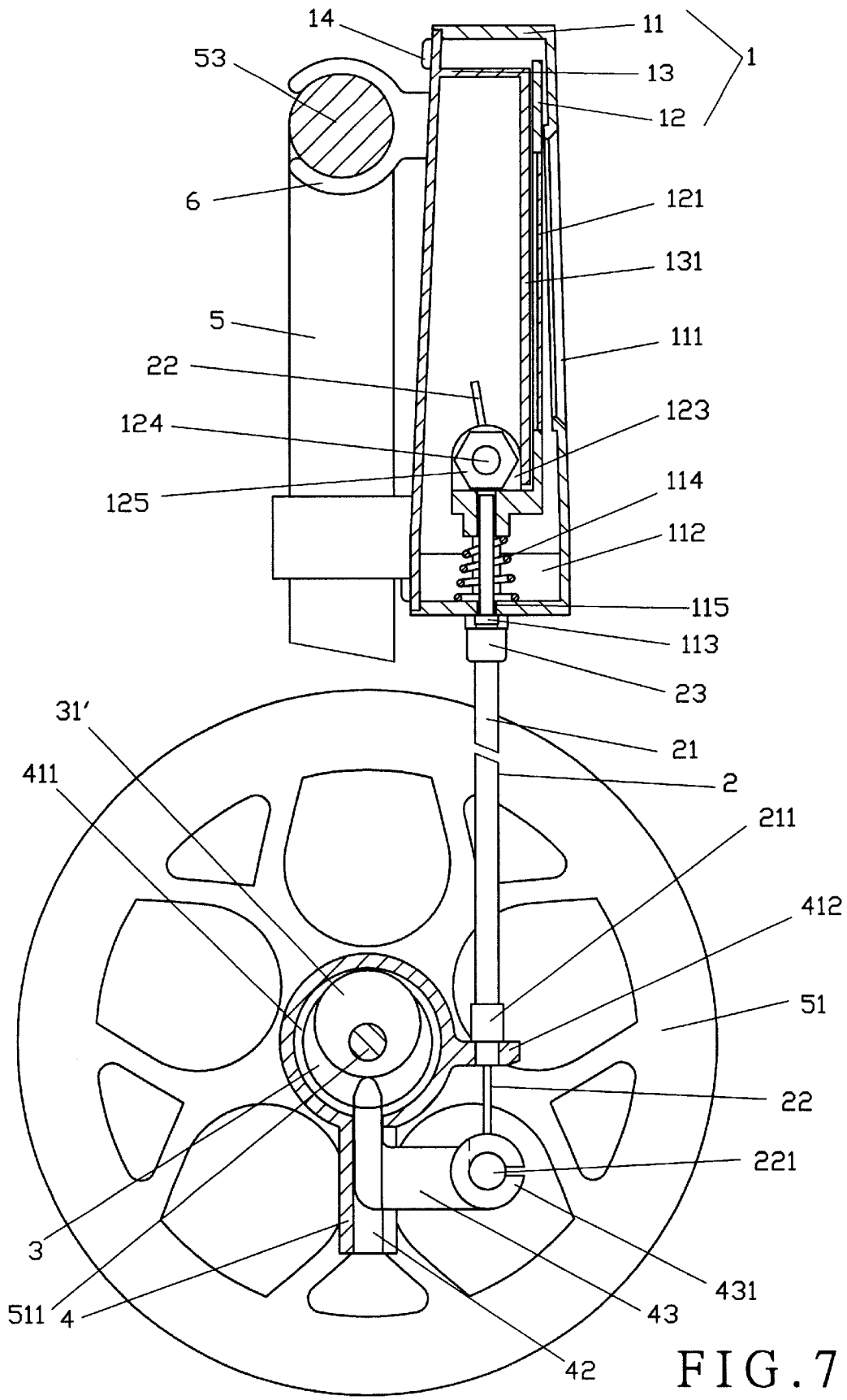
FIG. 7 is a sectional view of an assembly of another preferred embodiment of the present invention.
Figure 8:
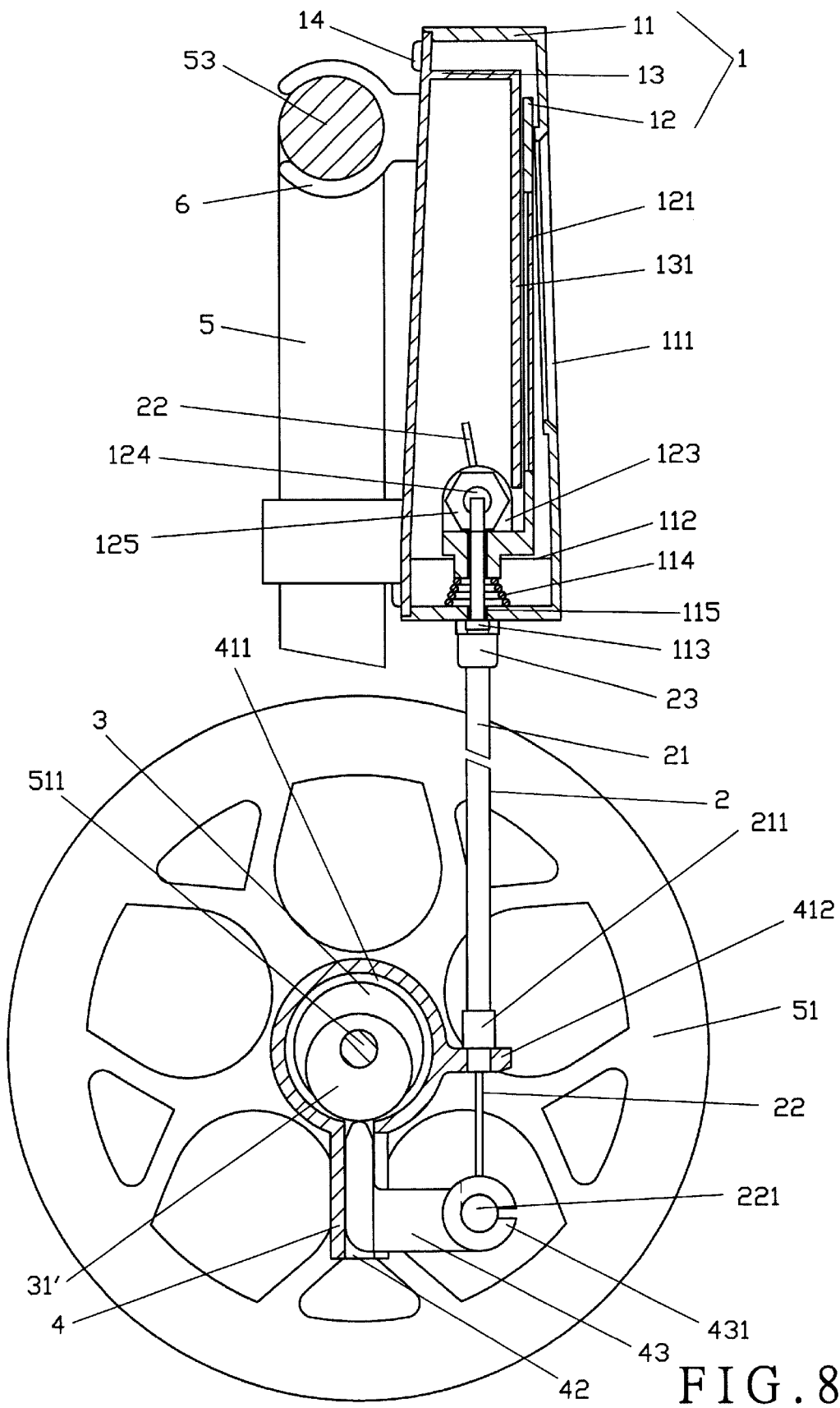
FIG. 8 is a schematic view showing the operation of another preferred embodiment of the present invention.

As illustrated in FIGS. 7 and 8, in a second preferred embodiment of the present invention, an eccentric gear is used in lieu of the cam for the active gear (31). As the curvature of the circumference of the eccentric gear is uniform, the animation effect displayed relates to a fashion of continuous motion since the passive part (43) gradually moves downward, then upward by compromising the curvature of the circumference of an active gear (31'), thus to drive the display panel (12) in the screen (1) with the linking cord (2) to gradually descend, then elevate to its original position at an equal speed between the display section (111) of the cabinet (11) and the board (13) of the cover plate (13). Therefore, the animation effect present by the present invention with the eccentric gear is different from that with the cam.

In either preferred embodiment using a cam or an eccentric gear, a 3D animation effect is achieved by the longitudinal motion of the transparent film (121) executed by the display section (111) of the cabinet (11) and the board (131) of the cover plate (13) and different visual effects are created depending on the cam or the eccentric gear selected according to the individual pattern applicable to a bike, a tricycle, a scooter, a shopping cart, a baby cart or a stationary bicycle.

As disclosed above, the present invention of a structure for a pedal cycle adapted with an animation display for being innovative to add more funs for the conventional pedal cycles.

I claim:

1. A structure of a wheeled cycle with an animation display, comprising:

a screen assembly including a cabinet, a display panel within the cabinet, a transparent film framed in said display panel, said transparent film having a plurality of lines protruding therefrom, elastic members provided in the cabinet for biasing said display panel to an original position, a cover plate, a board provided on said cover plate on a side facing said display panel, and a linking cord connected at one end to said display panel;

a transmission gear inserted into a hub of a wheel and an active gear with an eccentric shape being affixed to said transmission gear; and a retainer attached to a frame of the cycle in close relation to said transmission gear and a passive part provided within said retainer and in engagement with said active gear, said passive part being fastened to an opposite end of said linking cord;

wherein said transmission gear rotates in response to rotation of said wheel for rotating said active gear, said passive part being movable in responsive to rotation of said active gear for producing an up and down reciprocating motion of said display panel and said transparent film framed therein to produce a 3D animation effect for a pattern adhered to said board when viewed through said transparent film.

2. A structure of a wheeled cycle with an animation display as claimed in claim 1, wherein, the active gear is a cam.

3. A structure of a wheeled cycle with an animation display as claimed in claim 1, wherein, the active gear is an eccentric gear.

4. A structure of a wheeled cycle with an animation display as claimed in claim 1, wherein, a ring base separately extends from said passive part; a retaining block at one end of said linking cord is inserted into said ring base to secure said linking cord and said passive part.

* * * * *